(12) United States Patent
Suzuki

(10) Patent No.: US 7,952,032 B2
(45) Date of Patent: May 31, 2011

(54) GROMMET

(75) Inventor: Takashi Suzuki, Yokkaichi (JP)

(73) Assignee: Sumitomo Wiring Systems, Ltd., Mie (JP)

( * ) Notice: Subject to any disclaimer, the term of this patent is extended or adjusted under 35 U.S.C. 154(b) by 218 days.

(21) Appl. No.: 12/439,371

(22) PCT Filed: Mar. 7, 2007

(86) PCT No.: PCT/JP2007/054390
§ 371 (c)(1),
(2), (4) Date: Feb. 27, 2009

(87) PCT Pub. No.: WO2008/041378
PCT Pub. Date: Apr. 10, 2008

(65) Prior Publication Data
US 2010/0000764 A1    Jan. 7, 2010

(30) Foreign Application Priority Data

Sep. 29, 2006    (JP) .................................. 2006-268994

(51) Int. Cl.
*H01B 17/58* (2006.01)
(52) U.S. Cl. ................ 174/152 G; 174/153 G; 174/151; 174/135; 16/2.1; 249/56; 439/274; 439/607
(58) Field of Classification Search ............. 174/153 G, 174/151, 152 G, 650, 68.1, 68.3, 135; 16/2.1, 16/2.2; 248/56; 439/274, 275, 604, 607
See application file for complete search history.

(56) References Cited

U.S. PATENT DOCUMENTS

| 7,420,125 B2 * | 9/2008 | Tsukamoto et al. ...... 174/153 G |
| 7,659,480 B2 * | 2/2010 | Bikhleyzer ................ 174/153 G |
| 2003/0017027 A1 | 1/2003 | Nakata |
| 2003/0056974 A1 | 3/2003 | Nakata et al. |
| 2003/0141743 A1 | 7/2003 | Miyahara et al. |
| 2004/0206538 A1 | 10/2004 | Okuhara |
| 2005/0253384 A1 | 11/2005 | Taira |

(Continued)

FOREIGN PATENT DOCUMENTS

JP    2001-132871    5/2001

(Continued)

OTHER PUBLICATIONS

English language Abstract of JP 2002-374612, Dec. 26, 2002.

(Continued)

*Primary Examiner* — Dhiru R Patel
(74) *Attorney, Agent, or Firm* — Greenblum & Bernstein P.L.C.

(57) ABSTRACT

The present invention provides a grommet configured of an elastic body, which is externally mounted on a group of electric wires spanned between a vehicle-body panel and a movable body coupled to the vehicle-body panel with a hinge. The grommet includes short large-diameter tubular sections having annular locking grooves inserted into and locked to through-holes respectively provided in the vehicle-body panel and the movable body at both ends in the lengthwise direction; long small-diameter tubular sections that are continuous with the large-diameter tubular sections; and a corrugated tubular section continuously provided between the small-diameter tubular sections at the both ends, the corrugated tubular section being bent into a U shape when the movable body is closed. The small diameter tubular section at the locking side for the vehicle-body panel and a portion of the corrugated tubular section that is continuous with the small diameter tubular section are projectively provided with a rib that is continuous in a lengthwise direction, on outer peripheries thereof. The rib projects out of the outer peripheries of ridge and valley portions alternately provided on the corrugated tubular section, and the rigidity of the rib restrains the corrugated tubular section from curving outward.

4 Claims, 6 Drawing Sheets

U.S. PATENT DOCUMENTS

2006/0086524 A1    4/2006    Suzuki

FOREIGN PATENT DOCUMENTS

| | | |
|---|---|---|
| JP | 2001-258129 | 9/2001 |
| JP | 2002-374612 | 12/2002 |
| JP | 2003-212153 | 7/2003 |

OTHER PUBLICATIONS

English language Abstract of JP 2003-212153, Jul. 30, 2003.
English language Abstract of JP 2001-132871, May 18, 2001.
English language Abstract of JP 2001-258129, Sep. 21, 2001.

* cited by examiner (A)

(B)

(A)

(B)

(A)

(B)

(A)

(B)

GROMMET

BACKGROUND OF THE INVENTION

1. Field of the Invention

The present invention relates to a grommet and, more particularly, to a grommet externally mounted on a group of electric wires wired between a vehicle-body panel and a trunk lid of an automobile.

2. Description of Related Art

Conventionally, in wiring a wire harness in an automobile by spanning the wire harness between a vehicle-body panel 1 and a trunk lid 2 that is opened and closed, as shown in FIG. 6 (A) and FIG. 6 (B), a grommet 3 is externally mounted on the wire harness for waterproofing and dust resistance. The present applicant has provided such a grommet 3, as disclosed in Japanese Patent Laid-Open Publication No. 2001-258129 (Related Art 1). The grommet 3 is provided with a corrugated tubular section 3*a* through which a wire harness is inserted and locking tubular sections 3*b* that are continuous from ends of the corrugated tubular section 3*a*. The locking tubular sections 3*b* are inserted into and locked to through-holes respectively provided in the vehicle-body panel 1 and the trunk lid 2.

The number of the electric wires to be inserted through the grommet 3 is different according to the model and grade of an automobile. When the number of the electric wires is large, the electric wires have high rigidity. Thus, as shown in FIG. 7 (A), the grommet 3 bent into a U shape does not widely expand to an outer peripheral side thereof. Meanwhile, when the number of the electric wires is small, the electric wires have low rigidity. Thus, as shown in FIG. 7 (B), the grommet 3 bent into a U shape widely expands to the outer peripheral side thereof. As described, when the grommet 3 widely expands to the outer peripheral side, the grommet 3 interferes with a peripheral part 4 and the vehicle-body panel itself that are disposed in a limited space between the vehicle-body panel 1 and the trunk lid 2. Consequently, the grommet 3 could be damaged, or noise could be generated due to vibration of the vehicle. In particular, when the peripheral part 4 is a hinge coupling the vehicle-body panel 2 to the trunk lid 2, the grommet 3 could be pinched by the hinge and then damaged easily.

In order to resolve the above problems, as shown in FIG. 8, the mounting location of the grommet 3 to the vehicle-body panel 1 is moved away from the peripheral part 4. Thereby, the grommet 3 is prevented from interfering with the peripheral part 4 even when the grommet 3 widely expands to the outer peripheral side. However, in the above configuration, the mounting location of the grommet 3 on the vehicle-body panel 1 is too close to the trunk lid 2 and causes end portions of the grommet 3 to interfere with each other at an inner peripheral side of the grommet 3. Consequently, the grommet 3 could be damaged.

Related Art 1: Japanese Patent Laid-Open Publication No. 2001-258129

SUMMARY OF THE INVENTION

The present invention is provided in view of the above-described problems. Therefore, it is an object of the present invention to prevent a grommet from interfering with a peripheral part such as a hinge and the like or a vehicle-body panel regardless of the number of electric wires inserted through the grommet by partially improving the rigidity of the grommet.

In order to resolve the problems, the present invention provides a grommet configured of an elastic body and externally mounted on a group of electric wires spanned between a vehicle-body panel and a trunk lid that is coupled to the vehicle-body panel with a hinge. The grommet includes short large-diameter tubular sections provided at both ends thereof in a lengthwise direction, the large-diameter tubular sections having annular locking grooves inserted into and locked to through-holes respectively provided in the vehicle-body panel and the trunk lid; small-diameter tubular sections continuous with the large-diameter tubular sections at the both ends, respectively; and a corrugated tubular section continuously provided between the small-diameter tubular sections at the both ends, the corrugated tubular section being bent into a U shape when the trunk lid is closed. The small-diameter tubular section at a locking side for the vehicle-body panel is longer than the small-diameter tubular section at a trunk lid side. A rib is projectively and continuously provided, at the locking side for the vehicle-body panel alone, on an inner peripheral side of the corrugated tubular section bent into the U shape, from an outer surface at a position on the small-diameter tubular section proximate to a side continuous with the corrugated tubular section to an approximately middle point between a bent end of the corrugated tubular section bent into the U shape and an end of the corrugated tubular section continuous with the small-diameter tubular section, over a position, at which the small-diameter tubular section and the corrugated tubular section are connected. The rib is continuously provided on outer surfaces of large-diameter ridge portions and small-diameter valley portions alternately provided on the corrugated tubular section. In addition, the rib projects out of the ridge portions. Thereby, the rigidity of the rib prevents the corrugated tubular section from curving outward at the locking side for the vehicle-body panel and from contacting the hinge.

Since the grommet according to the present invention is provided with the rib for improved rigidity, on the corrugated tubular section at the locking side for the vehicle-body panel, wide expansion of the corrugated tubular section is prevented at the locking side for the vehicle-body panel when the grommet is bent into the U shape. Thereby, the grommet bent into the U shape does not widely expand at the locking side for the vehicle-body panel, so that the grommet is prevented from interfering with a peripheral part disposed at the vehicle-body panel side or with the vehicle-body panel, and from being damaged. Generation of noise due to the interference is also prevented. In addition, the rib is provided over a position at which the corrugated tubular section and the small-diameter tubular section are connected, not on the corrugated tubular section alone. Thereby, the rigidity of the grommet can be improved in a portion from a region in which the rib is projectively provided to an end portion at the locking side for the vehicle-body panel. Further, as described above, since the rigidity of the grommet itself is improved, not only a wire harness having a large number of electric wires and high rigidity, but also a wire harness having a small number of electric wires and low rigidity can be inserted through the grommet. Thereby, the versatility of the grommet can be enhanced. Furthermore, the rib is continuously provided on the outer surfaces of the valley portions and the ridge portions of the corrugated tubular section and projects out of the ridge portions, so that the rib has a continuous shape spanning over the valley portions and the ridge portions in the lengthwise direction. Thereby, the rib sufficiently improves the rigidity of the corrugated tubular section.

It is preferable that the rib be projectively provided at an inner peripheral side of the corrugated tubular section bent into the U shape. It is also preferable that a region in which the rib is projectively provided be from a position on the small-diameter tubular section proximate to a side continuous with the corrugated tubular section, to an approximately middle point between a bent end of the corrugated tubular section bent into the U shape and an end of the corrugated tubular section that is continuous with the small-diameter tubular section. It is further preferable that a projection amount of the rib be set from 1/5 to 1/20 of an external diameter of the ridge portion of the corrugated tubular section.

According to the above configuration, with respect to a portion of the corrugated tubular section from the bent end to the locking side for the vehicle-body panel, the rib is provided in the region at the locking side for the vehicle-body panel, which is approximately half the above portion of the corrugated tubular section, while no rib is provided in the remaining approximately half region of the above portion at the bent end side of the bellow tubular section. This configuration improves the rigidity of the corrugated tubular section in the region in which the rib is projectively provided and allows the corrugated tubular section to be sufficiently bent in the region having no rib. Thereby, the rib allows the grommet to follow an opening/closing operation of the trunk lid without interfering with the bending of the corrugated tubular section into the U shape. In addition, the projection amount of the rib is set from 1/5 to 1/20 of the external diameter of the ridge portion of the corrugated tubular section. The reason for this is that, with the projection amount smaller than 1/20, the rigidity of the corrugated tubular section is not sufficiently improved in the region in which the rib is projectively provided and that, with the projection amount larger than 1/5, the rib interferes with the opposed inner peripheral side of the corrugated tubular section when the grommet is bent into the U shape.

As described above, the hinge that couples the trunk lid to the vehicle-body panel is located outside the corrugated tubular section that is bent into the U shape, and the rib restrains the corrugated tubular section from curving outward. Thereby, the corrugated tubular section does not contact the hinge.

As described above, the rib is provided for improved rigidity, on the corrugated tubular section at the locking side for the vehicle-body panel, where wide expansion of the grommet to the outer peripheral side is undesirable when the grommet is bent into the U shape. Thereby, the corrugated tubular section at the locking side for the vehicle-body panel is prevented from widely expanding when the grommet is bent into the U shape. Consequently, since the grommet bent into the U shape does not widely expand at the locking side for the vehicle-body panel, the grommet is prevented from interfering with a peripheral part disposed at the vehicle-body panel side or with the vehicle-body panel, and from being damaged. Generation of noise due to the interference is also prevented.

BRIEF DESCRIPTION OF THE DRAWINGS

FIG. 1 (B) is a front view showing the grommet of the embodiment of the present invention;

FIG. 4 (B) is a plan view showing the grommet being mounted between the vehicle-body panel and the trunk lid;

Figure 1:
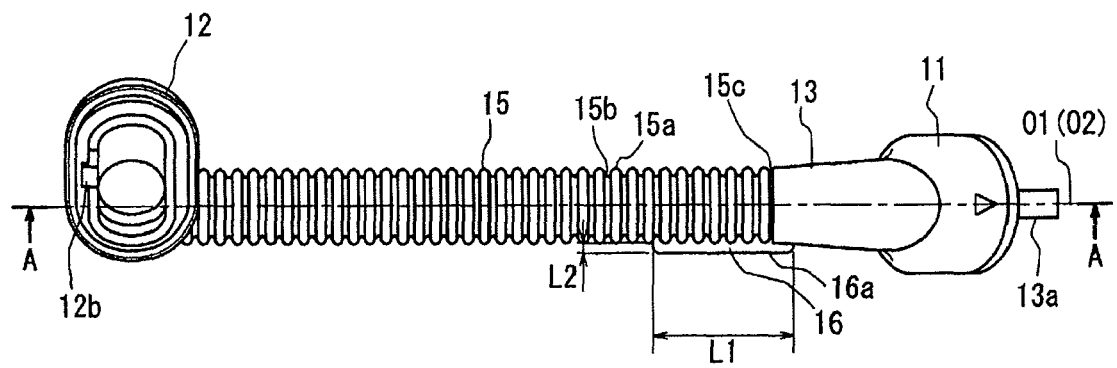
FIG. 1 (A) is a plan view showing a grommet of an embodiment of the present invention.
Figure 1:
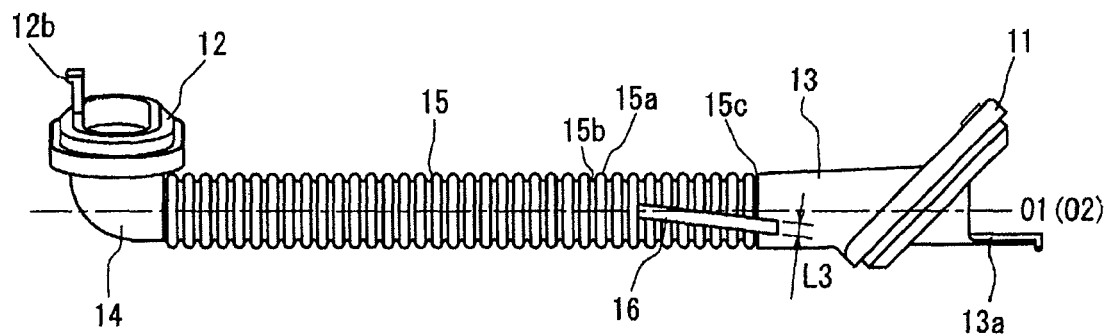
Figure 2:
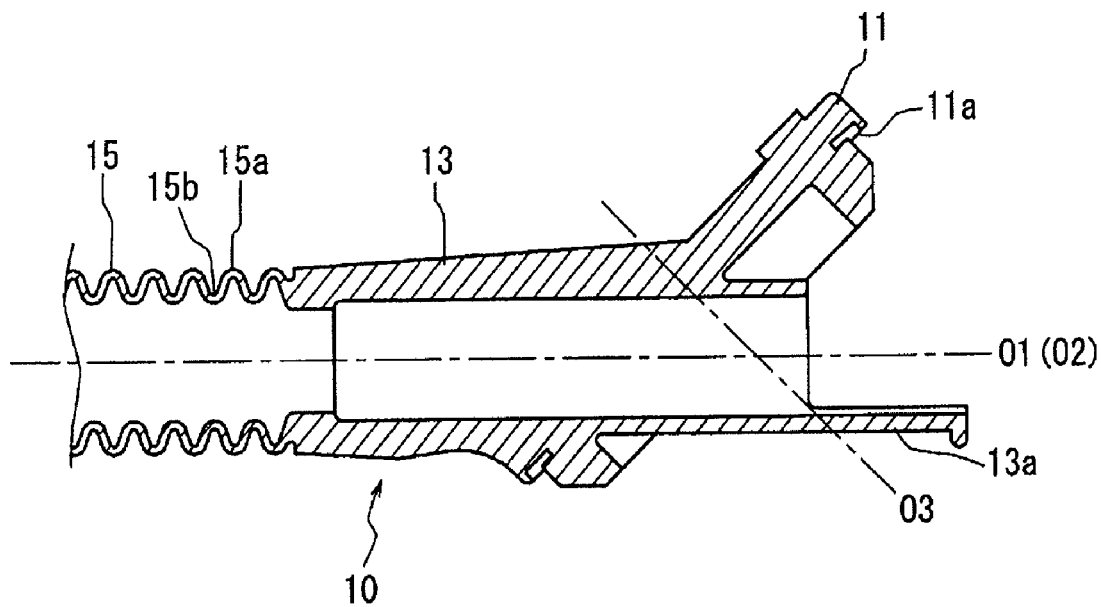
FIG. 2 is a sectional view taken along a line A-A of the grommet.

10: grommet
11, 12: large-diameter tubular section
11a, 12a: locking groove
13, 14: small-diameter tubular section
15: corrugated tubular section
15a: ridge portion
15b: valley portion
16: rib
20: vehicle-body panel
20a: through-hole
21: trunk lid (movable body)
21a: through-hole
22: hinge

DETAILED DESCRIPTION OF PREFERRED EMBODIMENTS

An embodiment of the present invention will be described hereinafter with reference to the drawings. FIG. 1 (A) through FIG. 4 (B) show the embodiment of the present invention. A grommet 10 is externally mounted on a group of electric wires (not shown) spanned between a vehicle-body panel 20 and a trunk lid 21 coupled to the vehicle-body panel 20 with a hinge.

The grommet 10 is integrally formed from rubber, such as EPDM (ethylene propylene rubber), or elastomer. The grommet 10 has short large-diameter tubular sections 11 and 12 at both ends thereof in a lengthwise direction. The short large-diameter tubular sections 11 and 12 have annular locking grooves 11a and 12a, which are inserted into and locked to through-holes 20a and 21a respectively provided in the vehicle-body panel 20 and the trunk lid 21. The grommet 10 also has long small-diameter tubular sections 13 and 14 that are continuous with the large-diameter tubular sections 11 and 12. The grommet 10 further has a corrugated tubular section 15 continuously provided between the small-diameter tubular sections 13 and 14 at both ends.

Figure 4:
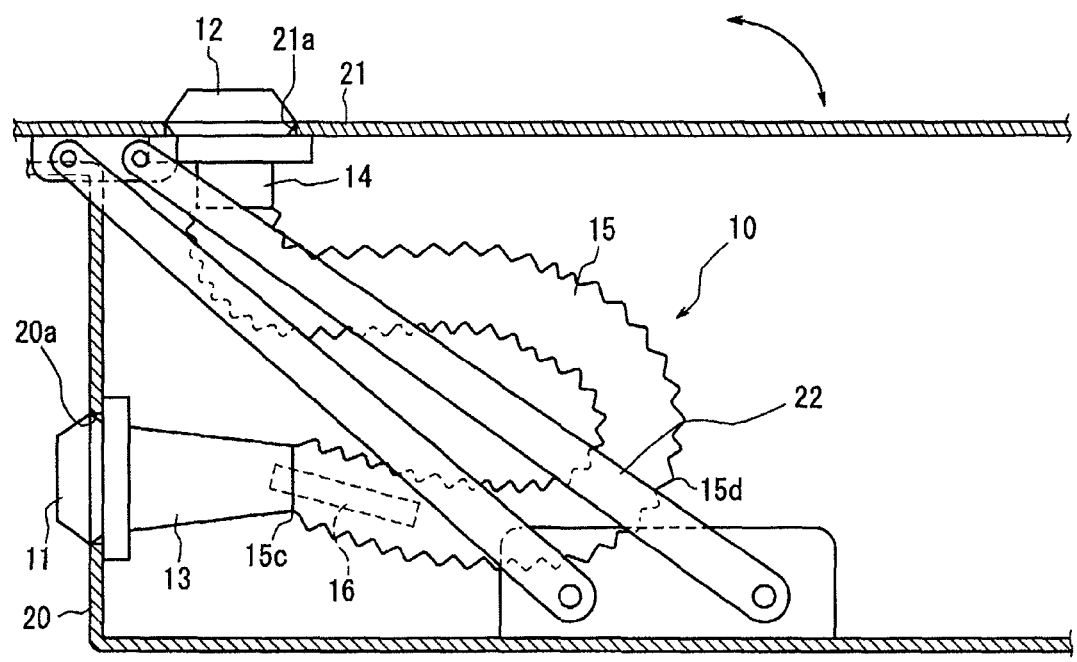
FIG. 4 (A) is a side view showing the grommet being mounted between a vehicle-body panel and the trunk lid.
Figure 4:
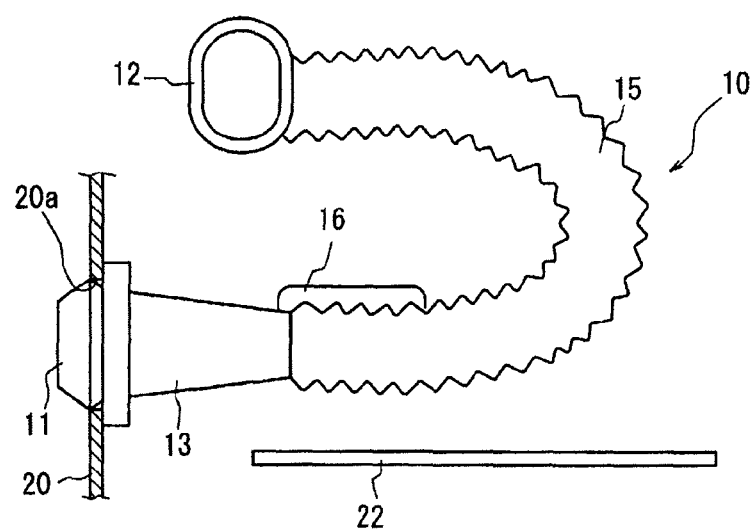

The corrugated tubular section 15 of the grommet 10 is alternately provided with large-diameter ridge portions 15a and small-diameter valley portions 15b in the lengthwise direction and thus is bendable. As shown in FIG. 4 (A) and FIG. 4 (B), the corrugated tubular section 15 is bent into a U shape when the trunk lid 21 is closed. In the present embodiment, an external diameter of the ridge portion 15a is set to 22 mm (millimeter), and an inner diameter of the valley portion 15b to 14 mm. The small-diameter tubular section 13 at the locking side for the vehicle-body panel 20 and a portion of the corrugated tubular section 15 that is continuous with the small-diameter tubular section 13 are projectively provided with a rib 16 on outer peripheries thereof, the rib 16 being continuous in the lengthwise direction over the ridge portions 15a and the valley portions 15b. As shown in FIG. 4 (A) and FIG. 4 (B), the rib 16 is provided on an inner peripheral side of the corrugated tubular section 15 bent into the U shape. One end of the rib 16 at a locking side for a vehicle-body is located 6 mm away from a continuous end 15c of the corrugated tubular section 15, which is continuous with the small-diameter tubular section 13, on the small-diameter tubular section 13. Meanwhile, another end of the rib 16 is located at an approximately middle position between a bent end 15d and the continuous end 15c of the corrugated tubular section 15. A length L1 of the rib 16 is 44.9 mm in the present embodiment. In addition, a projection amount L2 of the rib 16 from an external surface of the ridge portion 15a is 3 mm and approximately /1;7 of the external diameter of the ridge portion 15a of the corrugated tubular section 15. Both end portions of a projecting forward end surface 16a is a circular arc surface having a radius of 2 mm. Further, a width L3 of the rib 16 is 3.5 mm, and, as shown in FIG. 1 (B), the rib 16 is inclined to a center axis O1 of the corrugated tubular section 15 by 3-10 degrees. In the present embodiment, the rib 16 is inclined to the center axis O1 of the corrugated tubular section 15 by 5 degrees, so that the corrugated tubular section 15 is restrained from sagging to a lower side in FIG. 1 (B) and FIG. 4 (A).

Figure 3:
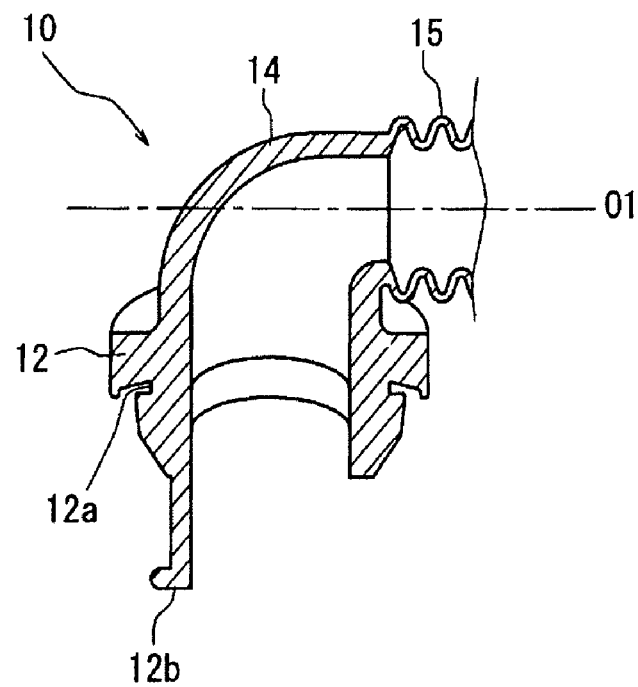
FIG. 3 is a sectional view showing an enlarged main portion of a trunk lid locking side of the grommet.

As described above, the corrugated tubular section 15 is provided with the small-diameter tubular section 13 that is continuous therewith at the locking side for the vehicle-body panel to match a center axis O2 of the small-diameter tubular section 13 to the center axis O1 of the corrugated tubular section 15. In addition, the small-diameter tubular section 13 has a long length of 65 mm and is projectively provided with a tape winding tab 13a to secure a group of electric wires to a forward end thereof with tape. Further, as shown in FIG. 3, the large-diameter tubular section 11 having a short length and an elliptical shape is provided to surround the outer periphery of the small-diameter tubular section 13 at the forward end side. The large-diameter tubular section 11 is provided with the locking groove 11a having an annular shape, on an outer periphery thereof. A center axis O3 of the large-diameter tubular section 11 is inclined to the center axis O2 of the small diameter tubular section.

Meanwhile, the corrugated tubular section 15 is provided with the small-diameter tubular section 14 that is continuous therewith at the locking side for the trunk lid 21. As shown in FIG. 3, the small-diameter tubular section 14 is bent at approximately 90 degrees to the center axis O1 of the corrugated tubular section 15 and is provided with the large-diameter tubular section 12 having an elliptical shape that is continuous therewith, on a forward end of the bent side. The large-diameter tubular section 12 is provided with the locking groove 12a having an annular shape, on an outer periphery thereof. In addition, the large-diameter tubular section 12 is projectively provided with a tape winding tab 12b to secure a group of electric wires to a forward end thereof with tape.

A group of electric wires spanned between the vehicle-body panel 20 and the trunk lid 21 is inserted into the grommet 10 and fixed to the tape winding tabs 13a and 12b disposed at the both ends of the grommet 10 by winding with tape. The locking grooves 11a and 12a of the large-diameter tubular sections 11 and 12 disposed at the both ends are fitted to circumferences of the through-holes 20a and 21a respectively provided in the vehicle-body panel 20 and the trunk lid 21. Thereby, the grommet 10 is mounted to the vehicle-body panel 20 and to the trunk lid 21 by spanning the grommet 10 therebetween. In a state in which the trunk lid 21 is opened relative to the vehicle-body panel 20, the corrugated tubular section 15 of the grommet 10 substantially linearly stretches. Meanwhile, in a state in which the trunk lid 21 is closed relative to the vehicle-body panel 20, as shown in FIG. 4 (A) and FIG. 4 (B), the corrugated tubular section 15 is bent into the U shape. A hinge 22 coupled to the trunk lid 21 and to the vehicle-body panel 20 is disposed outside of the corrugated tubular section 15 in its bent state on a side locked to the vehicle-body panel 20.

Figure 5:
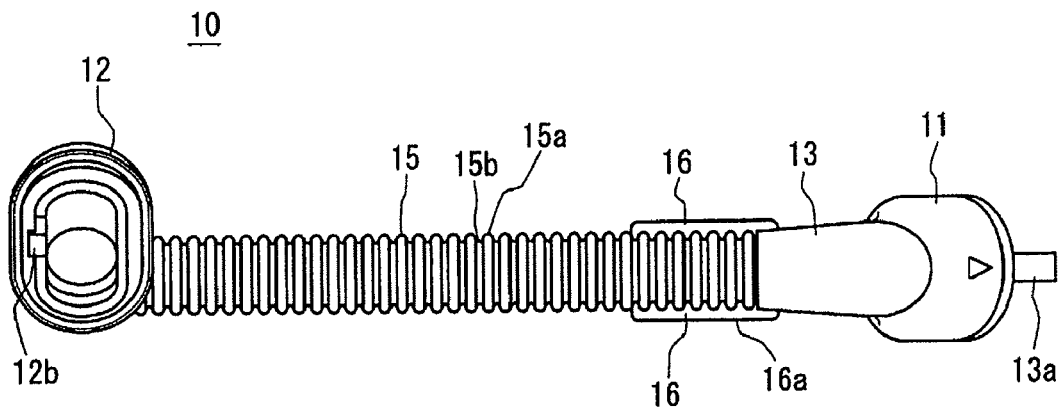
FIG. 5 shows an exemplary modification of the embodiment of the present invention.
Figure 6:
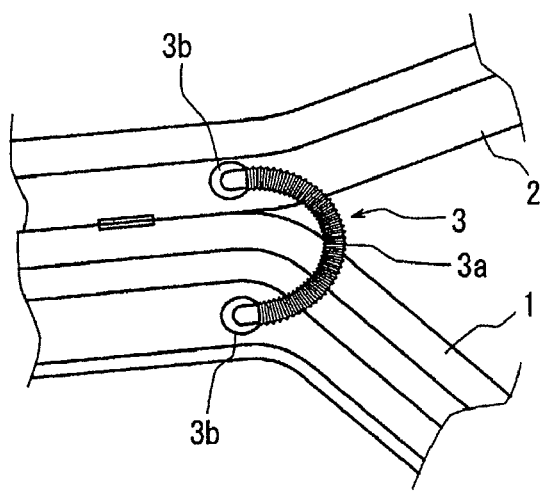
FIG. 6 (A) and FIG. 6 (B) show a conventional art.
Figure 6:
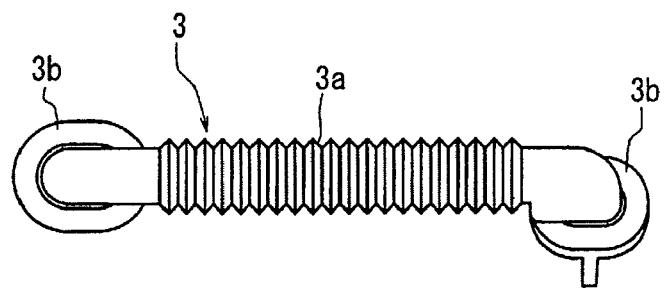
Figure 7:
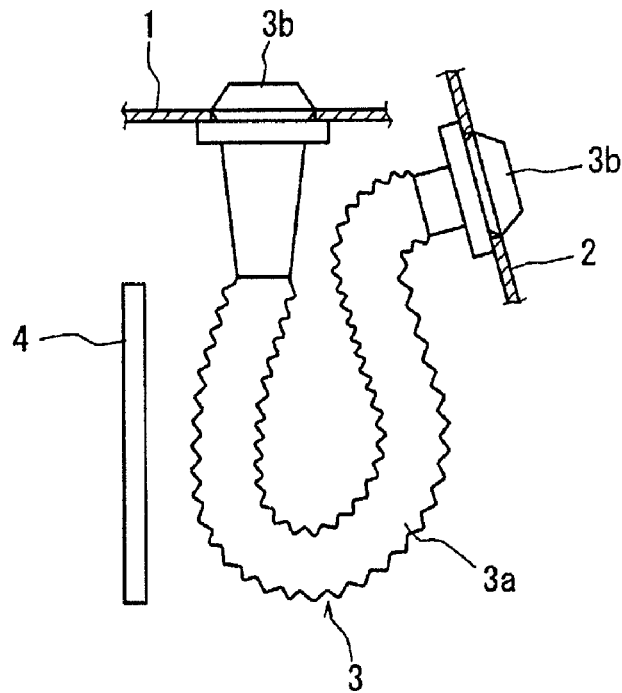
FIG. 7 (A) and FIG. 7 (B) show a problem with the conventional art.
Figure 7:
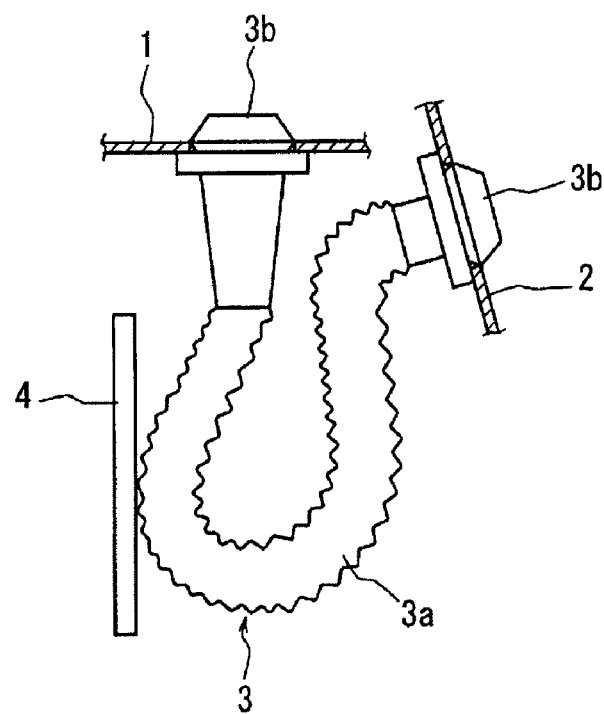
Figure 8:
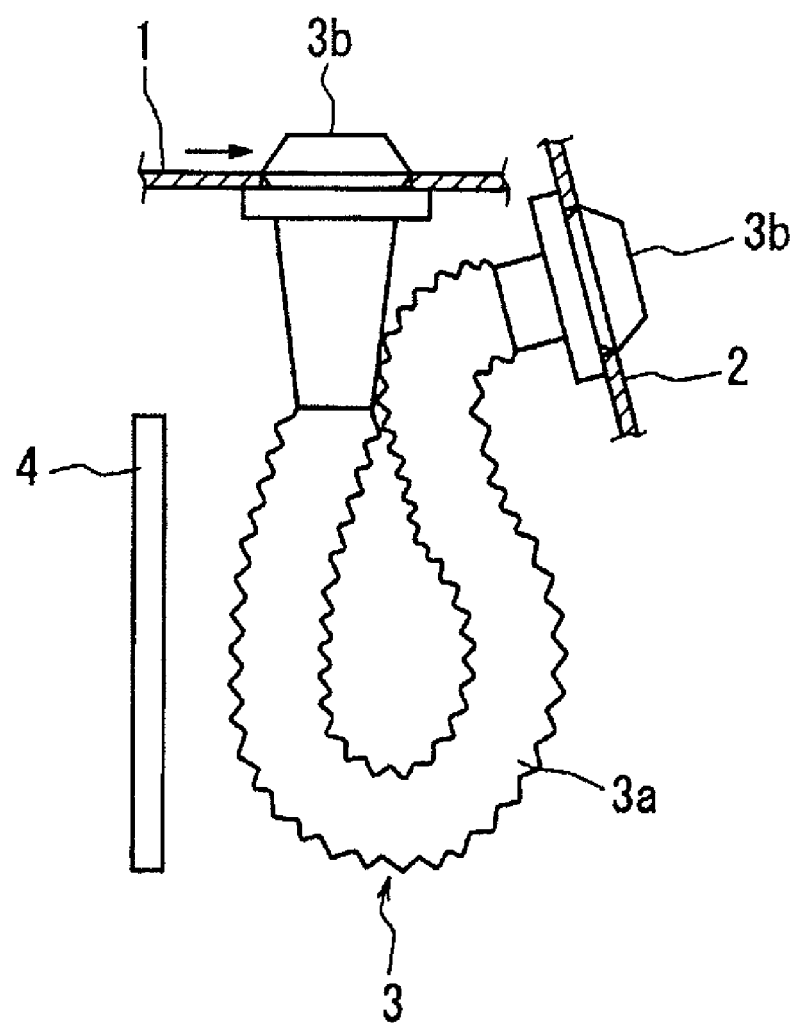
FIG. 8 shows another problem with the conventional art.

In the above configuration, the rib 16 is provided for improved rigidity, on the small-diameter tubular section 13 and on the corrugated tubular section 15 at the locking side for the vehicle-body panel 20, where wide expansion of the grommet 10 to an outer peripheral side is undesirable when the grommet 10 is bent into the U shape. Thereby, the corrugated tubular section 15 at the locking side for the vehicle-body panel 20 is prevented from widely expanding and curving when the grommet 10 is bent into the U shape. Consequently, since the grommet 10 bent into the U shape does not widely expand at the locking side for the vehicle-body panel 20, the grommet 10 is prevented from interfering with the hinge 22 coupled to the vehicle-body panel 20 and to the trunk lid 21, and from being damaged. Generation of noise due to the interference is also prevented. In addition, as described above, since the rigidity of the grommet 10 itself is improved, not only a wire harness having a large number of electric wires and high rigidity, but also a wire harness having a small number of electric wires and low rigidity can be inserted through the grommet 10. Thereby, the versatility of the grommet 10 can be enhanced. In the present embodiment, the rib 16 is provided at the inner peripheral side of the grommet 10 in its bent state; however, as shown in FIG. 5, the rib 16 may also be provided at the outer peripheral side of the grommet in its bent state.

What is claimed is:

1. A grommet having an elastic body and externally mounted on a group of electric wires spanned between a vehicle-body panel and a trunk lid coupled to the vehicle-body panel with a hinge, comprising:

short large-diameter tubular sections provided at both ends thereof in a lengthwise direction, the short large-diameter tubular sections having annular locking grooves inserted into and locked to through-holes respectively provided in the vehicle-body panel and the trunk lid;

long small-diameter tubular sections continuous with the short large-diameter tubular sections at the both ends, respectively; and a corrugated tubular section continuously provided between the long small-diameter tubular sections at the both ends, the corrugated tubular section being bent into a U shape when the trunk lid is closed, wherein the long small-diameter tubular section at the locking side for the vehicle-body panel is longer than the long small-diameter tubular section at a trunk lid side; a rib is continuously provided, at the locking side for the vehicle-body panel alone, on an inner peripheral side of the corrugated tubular section bent into the U shape, from an outer surface at a position on the long small-diameter tubular section proximate to a side continuous with the corrugated tubular section to an approximately middle point between a bent end of the corrugated tubular section bent into the U shape and an end of the corrugated tubular section continuous with the long small-diameter tubular section, over a position, at which the long small-diameter tubular section and the corrugated tubular section are connected; the rib is continuously provided on outer surfaces of large-diameter ridge portions and small-diameter valley portions alternately provided on the corrugated tubular section and projects out of the large-diameter ridge portions; and a rigidity of the rib prevents the corrugated tubular section from curving outward at the locking side for the vehicle-body panel and from contacting the hinge.

2. The grommet according to claim 1, wherein the rib is inclined by 3-10 degrees relative to a central axis of the long small-diameter tubular section and the corrugated tubular section; and a projection amount of the rib is set from $\frac{1}{5}$ to $\frac{1}{20}$ of an external diameter of the ridge portion of the corrugated tubular section.

3. The grommet according to claim 2, wherein
a movable body is comprised of the trunk lid; the hinge coupled to the trunk lid and to the vehicle-body panel is located outside the corrugated tubular section that is bent into the U shape; and the rib restrains the corrugated tubular section from curving outward, so that the corrugated tubular section does not contact the hinge.

4. The grommet according to claim 1, wherein
the trunk lid is comprised of a movable body;
the hinge coupled to the trunk lid and to the vehicle-body panel is located outside the corrugated tubular section that is bent into the U shape; and the rib restrains the corrugated tubular section from curving outward, so that the corrugated tubular section does not contact the hinge.

* * * * *